US011196526B2

United States Patent
Kwak et al.

(10) Patent No.: US 11,196,526 B2
(45) Date of Patent: Dec. 7, 2021

(54) METHOD FOR TRANSMITTING AND RECEIVING UPLINK CONTROL CHANNEL AND DEVICE THEREFOR

(71) Applicant: LG ELECTRONICS INC., Seoul (KR)

(72) Inventors: Kyuhwan Kwak, Seoul (KR); Seungmin Lee, Seoul (KR); Yunjung Yi, Seoul (KR); Hyunho Lee, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 16/633,928

(22) PCT Filed: Aug. 6, 2018

(86) PCT No.: PCT/KR2018/008884
§ 371 (c)(1),
(2) Date: Jan. 24, 2020

(87) PCT Pub. No.: WO2019/031782
PCT Pub. Date: Feb. 14, 2019

(65) Prior Publication Data
US 2021/0152316 A1 May 20, 2021

Related U.S. Application Data

(60) Provisional application No. 62/543,415, filed on Aug. 10, 2017, provisional application No. 62/593,153, filed on Nov. 30, 2017.

(51) Int. Cl.
*H04L 5/00* (2006.01)
*H04L 27/26* (2006.01)
*H04W 72/04* (2009.01)

(52) U.S. Cl.
CPC ........ *H04L 5/0055* (2013.01); *H04L 27/2605* (2013.01); *H04W 72/0413* (2013.01); *H04W 72/0446* (2013.01)

(58) Field of Classification Search
CPC . H04L 5/0055; H04L 27/2605; H04L 5/0012; H04L 1/1861; H04W 72/0413; H04W 72/0446
See application file for complete search history.

(56) References Cited

U.S. PATENT DOCUMENTS 10,560,229 B2 * 2/2020 Xiong .................... H04L 5/0055
2006/0045053 A1 * 3/2006 Erlich .................... H04W 16/14
370/338

(Continued)

FOREIGN PATENT DOCUMENTS

| WO | 2017079539 | 5/2017 |
| WO | 2017093186 | 6/2017 |
| WO | 2017127152 | 7/2017 |

OTHER PUBLICATIONS

R1-080707, "Cell Specific CS Hopping and Slot Based CS/OC Remapping on PUCCH", Texas Instruments, Feb. 11-15, 2008, Sorrento, Italy (Year: 2008).*

(Continued)

*Primary Examiner* — Ayaz R Sheikh
*Assistant Examiner* — Tarell A Hampton
(74) *Attorney, Agent, or Firm* — Lee, Hong, Degerman, Kang & Waimey

(57) ABSTRACT

Disclosed is a method by which a terminal transmits an acknowledgement (ACK)/negative ACK (NACK) signal in a wireless communication system. In particular, the method is characterized by receiving data from a base station, generating an ACK signal or a NACK signal corresponding to the data, transmitting the ACK signal to the base station on the basis of a first hopping pattern when the ACK signal (Continued)

Structure of PUCCH formats 2, 2a, and 2b (normal CP case)

is generated according to the data, and transmitting the NACK signal to the base station on the basis of a second hopping pattern different from the first hopping pattern when the NACK signal is generated according to the data. The terminal is capable of communicating with at least one of another terminal, a terminal related to an autonomous driving vehicle, the base station or a network.

6 Claims, 13 Drawing Sheets

(56) References Cited

U.S. PATENT DOCUMENTS

| | | | |
|---|---|---|---|
| 2008/0187027 A1* | 8/2008 | Malladi | H04B 1/713 375/135 |
| 2008/0298433 A1* | 12/2008 | Tiirola | H04J 13/0074 375/132 |
| 2009/0060004 A1* | 3/2009 | Papasakellariou | H04J 13/0074 375/140 |
| 2011/0019529 A1 | 1/2011 | Wang et al. | |
| 2011/0070850 A1* | 3/2011 | Kwon | H04B 7/06 455/129 |
| 2011/0317640 A1* | 12/2011 | Kawamura | H04L 5/0048 370/329 |
| 2014/0078972 A1* | 3/2014 | Sorrentino | H04J 13/0074 370/329 |
| 2014/0211747 A1* | 7/2014 | Takeda | H04L 1/1861 370/329 |
| 2016/0095104 A1 | 3/2016 | Chen et al. | |
| 2016/0218834 A1 | 7/2016 | Bohn | |
| 2019/0081722 A1* | 3/2019 | Takeda | H04L 27/2607 |
| 2019/0098622 A1* | 3/2019 | Lee | H04W 72/0446 |
| 2019/0173703 A1* | 6/2019 | Gao | H04L 5/0055 |

OTHER PUBLICATIONS

European Patent Office Application Serial No. 18844369.1, Search Report dated Feb. 12, 2021, 10 pages.

LG Electronics, "Further discussion on sPUCCH design," 3GPP TSG RAN WG1 Meeting #89, R1-1707546, May 2017, 5 pages.

Panasonic et al., "Way forward on the Cyclic Shift Hopping for PUCCH," 3GPP TSG RAN WG1 Meeting #51bis, R1-080558, Jan. 2008, 2 pages.

LG Electronics, "Discussion on sPUCCH design," 3GPP TSG RAN WG1 Meeting #88, R1-1702424, Feb. 2017, 4 pages.

PCT International Application No. PCT/KR2018/008884, Written Opinion of the International Searching Authority dated Nov. 13, 2018, 19 pages.

* cited by examiner

FIG. 1
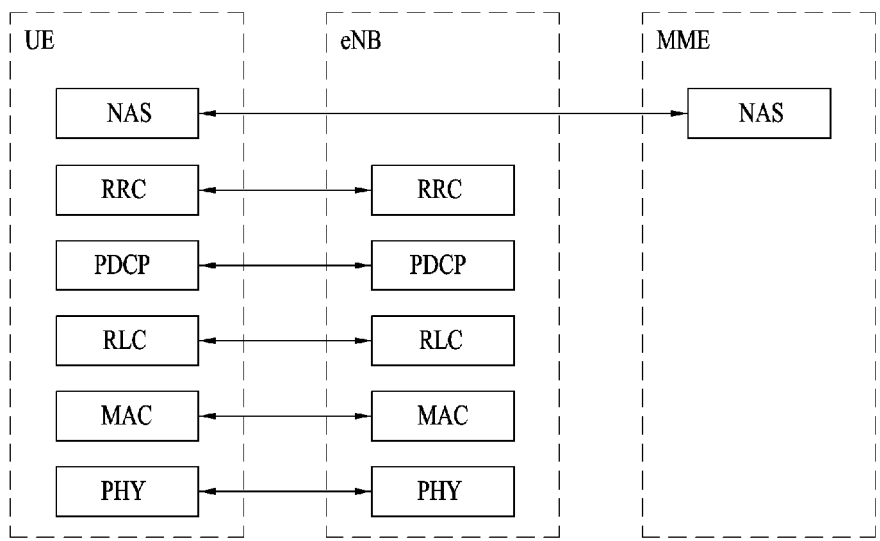
(A) CONTROL-PLANE PROTOCOL STACK
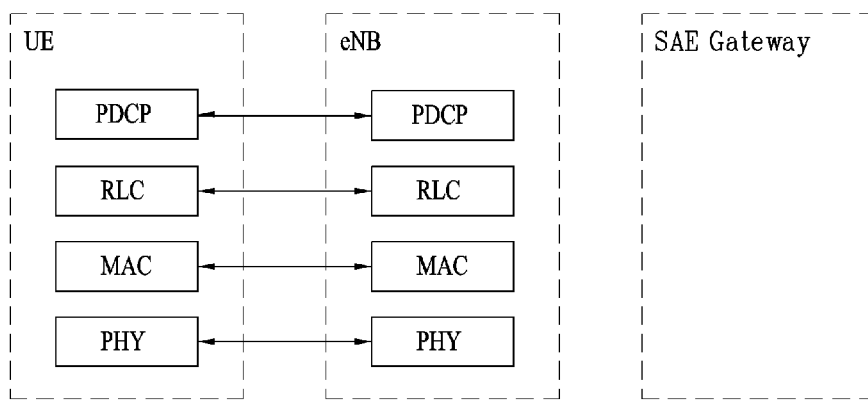
(B) USER-PLANE PROTOCOL STACK Structure of PUCCH formats 1a and 1b (normal CP case)

Structure of PUCCH formats 1a and 1b (extended CP case)

Structure of PUCCH formats 2, 2a, and 2b (normal CP case)

Structure of PUCCH formats 2, 2a, and 2b (normal CP case)

FIG. 7

Resource allocation: 18 ACK/NACK channels with normal CP $\Delta_{shift}^{PUCCH} = 2$

| Cell-specific CS offset | | RS orthogonal cover | | | ACK/NACK orthogonal cover | | |
|---|---|---|---|---|---|---|---|
| $\delta_{offset}^{PUCCH}=1$ $n_{CS}=1$ | $\delta_{offset}^{PUCCH}=0$ $n_{CS}=0$ | $\bar{n}_{OC}=0$ | $\bar{n}_{OC}=1$ | $\bar{n}_{OC}=2$ | $n_{OC}=0$ | $n_{OC}=1$ | $n_{OC}=2$ |
| 2 | 1 | n'=0 | | 12 | n'=0 | | 12 |
| 3 | 2 | | 6 | | | 6 | |
| 4 | 3 | 1 | | 13 | 1 | | 13 |
| 5 | 4 | | 7 | | | 7 | |
| 6 | 5 | 2 | | 14 | 2 | | 14 |
| 7 | 6 | | 8 | | | 8 | |
| 8 | 7 | 3 | | 15 | 3 | | 15 |
| 9 | 8 | | 9 | | | 9 | |
| 10 | 9 | 4 | | 16 | 4 | | 16 |
| 11 | 10 | | 10 | | | 10 | |
| 0 | 11 | 5 | | 17 | 5 | | 17 |
| | | | 11 | | | 11 | |

$\Delta_{shift}^{PUCCH} \in \{\{1,2,3\}$ for normal CP, $\{1,2,3\}$ for extended CP$\}$ $\delta_{offset}^{PUCCH} \in \{0,1,...,\Delta_{shift}^{PUCCH}-1\}$ Cell-specific CS offset Cell-specific CS value of CAZAC sequence

- $n_{OC}$: Orthogonal sequence index for ACK/NACK
- $\bar{n}_{OC}$: Orthogonal sequence index for RS
- $n_{CS}$: CS value of CAZAC sequence
- $n'$: ACK/NACK resource index used for channelization in RB

METHOD FOR TRANSMITTING AND RECEIVING UPLINK CONTROL CHANNEL AND DEVICE THEREFOR

CROSS-REFERENCE TO RELATED APPLICATIONS

This application is the National Stage filing under 35 U.S.C. 371 of International Application No. PCT/KR2018/008884, filed on Aug. 6, 2018, which claims the benefit of U.S. Provisional Application Nos. 62/543,415, filed on Aug. 10, 2017, and 62/593,153, filed on Nov. 30, 2017, the contents of which are all hereby incorporated by reference herein in their entirety.

TECHNICAL FIELD

The present disclosure relates to a method for transmitting and receiving an uplink control channel and device therefor, and more particularly, to a method of generating a sequence for an acknowledgement/negative-acknowledgement (ACK/NACK) signal to distinguish between an ACK and a NACK and mapping resources therefor when a terminal transmits the ACK/NACK signal in response to received data and device therefor.

BACKGROUND ART

As more and more communication devices demand greater communication traffic as times go by, the next generation 5G system, which is wireless broadband communication, is being required over the existing LTE systems. In the next generation 5G system named New RAT, communication scenarios are classified into Enhanced Mobile Broadband (eMBB), Ultra-reliability and low-latency communication (URLLC), Massive Machine-Type Communications (mMTC), etc.

Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

DISCLOSURE

Technical Problem

The object of the present disclosure is to provide a method for transmitting and receiving an uplink control channel and device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of transmitting an ACK/NACK signal by a UE in a wireless communication system. The method may include: receiving data from a base station; generating an ACK signal or a NACK signal in response to the data; when the ACK signal is generated in response to the data, transmitting the ACK signal to the base station according to a first hopping pattern; and when the NACK signal is generated in response to the data, transmitting the NACK signal to the base station according to a second hopping pattern, which is different from the first hopping pattern.

In this case, the ACK signal may be generated by applying a first cyclic shift (CS) value to a base sequence for transmitting the ACK/NACK signal, and the NACK signal may be generated by applying a second CS value, which is different from the first CS value, to the base sequence.

The first and second CS values may be determined based on a cell-specific CS value configured for each cell and an offset value configured for each UE.

The first CS value may be determined by applying the offset value to the cell-specific CS value.

The second CS value may be determined such that a difference between the first and second CS values becomes a specific value. In this case, the specific value may depend on the length of the base sequence and the number of bits of the ACK/NACK signal.

The cell-specific CS value may be determined based on the index of a transmission time interval (TTI) for transmitting the ACK signal or the NACK signal.

The second hopping pattern may be a reverse pattern of the first hopping pattern.

In another aspect of the present disclosure, provided herein is a UE for transmitting an ACK/NACK signal in a wireless communication system. The UE may include: a transceiver configured to transmit and receive a signal to and from a base station; and a processor configured to control the transceiver. The processor may be configured to: control transceiver to receive data from the base station; generate an ACK signal or a NACK signal in response to the data; when the ACK signal is generated in response to the data, control the transceiver to transmit the ACK signal to the base station according to a first hopping pattern; when the NACK signal is generated in response to the data, control the transceiver to transmit the NACK signal to the base station according to a second hopping pattern, which is different from the first hopping pattern.

In this case, the ACK signal may be generated by applying a first CS value to a base sequence for transmitting the ACK/NACK signal, and the NACK signal may be generated by applying a second CS value, which is different from the first CS value, to the base sequence.

The first and second CS values may be determined based on a cell-specific CS value configured for each cell and an offset value configured for each UE.

The first CS value may be determined by applying the offset value to the cell-specific CS value, and the second CS value may be determined such that a difference between the first and second CS values becomes a specific value. In this case, the specific value may depend on the length of the base sequence and the number of bits of the ACK/NACK signal.

The cell-specific CS value may be determined based on the index of a TTI for transmitting the ACK signal or the NACK signal.

The second hopping pattern may be a reverse pattern of the first hopping pattern.

In still another aspect of the present disclosure, provided herein is a method of receiving an ACK/NACK signal by a base station in a wireless communication system. The method may include: transmitting data to a UE; receiving the ACK/NACK signal in response to the data; when the ACK/NACK signal is received according to a first hopping pattern, determining that the ACK/NACK signal indicates an ACK; and when the ACK/NACK signal is received according to a second hopping pattern, which is different from the first hopping pattern, determining that the ACK/NACK signal indicates a NACK.

In a further aspect of the present disclosure, provided herein is a base station for receiving an ACK/NACK signal in a wireless communication system. The base station may include: a transceiver configured to transmit and receive a signal to and from a UE; and a processor configured to control the transceiver. The processor may be configured to: control the transceiver to transmit data to the UE; control the transceiver to receive the ACK/NACK signal in response to the data; when the ACK/NACK signal is received according to a first hopping pattern, determine that the ACK/NACK signal indicates an ACK; and when the ACK/NACK signal is received according to a second hopping pattern, which is different from the first hopping pattern, determine that the ACK/NACK signal indicates a NACK.

Advantageous Effects

According to the present disclosure, a base station may efficiently determine whether a signal on an uplink control channel transmitted from a UE is an ACK or a NACK.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

FIG. 1 is a diagram illustrating structures of a control plane and a user plane of a radio interface protocol between a UE and an E-UTRAN based on the 3GPP radio access network specification.

FIG. 7 illustrates ACK/NACK channelization for PUCCH formats 1a and 1b.

BEST MODE

Figure 2:
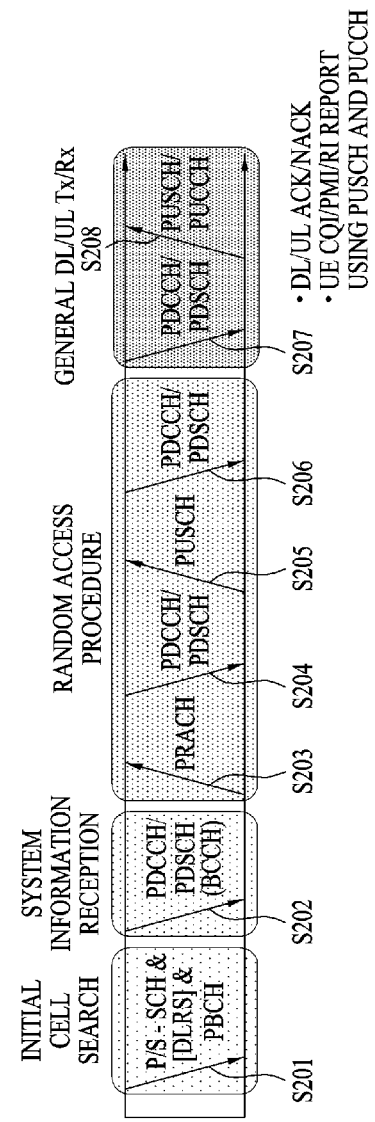
FIG. 2 is a diagram illustrating physical channels used in a 3GPP system and a general signal transmission method using the same.

Hereinafter, the structures, operations, and other features of the present disclosure will be understood readily from the embodiments of the present disclosure, examples of which are described with reference to the accompanying drawings. The embodiments which will be described below are examples in which the technical features of the present disclosure are applied to a 3GPP system.

Although the embodiments of the present disclosure will be described based on an LTE system and an LTE-Advanced (LTE-A) system, the LTE system and the LTE-A system are only exemplary and the embodiments of the present disclosure may be applied to all communication systems corresponding to the aforementioned definition.

In the present disclosure, a base station (eNB) may be used as a broad meaning including a remote radio head (RRH), an eNB, a transmission point (TP), a reception point (RP), a relay, etc.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in DL and is modulated using a Single-Carrier Frequency Division Multiple Access (SC-FDMA) scheme in UL.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

DL transport channels for data transmission from a network to a UE include a Broadcast Channel (BCH) for transmitting system information, a Paging Channel (PCH) for transmitting paging messages, and a DL Shared Channel (SCH) for transmitting user traffic or control messages. Traffic or control messages of a DL multicast or broadcast service may be transmitted through the DL SCH or may be transmitted through an additional DL Multicast Channel (MCH). Meanwhile, UL transport channels for data transmission from the UE to the network include a Random Access Channel (RACH) for transmitting initial control messages and a UL SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

FIG. 2 is a view illustrating physical channels used in a 3GPP system and a general signal transmission method using the same.

A UE performs initial cell search such as establishment of synchronization with an eNB when power is turned on or the UE enters a new cell (step S201). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a DL Reference Signal (DL RS) in the initial cell search step to confirm a DL channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S202).

Meanwhile, if the UE initially accesses the eNB or if radio resources for signal transmission are not present, the UE may perform a random access procedure (steps S203 to S206) with respect to the eNB. To this end, the UE may transmit a specific sequence through a Physical Random Access Channel (PRACH) as a preamble (steps S203 and S205), and receive a response message to the preamble through the PDCCH and the PDSCH corresponding thereto (steps S204 and S206). In the case of a contention-based RACH, a contention resolution procedure may be additionally performed.

The UE which performs the above procedures may receive a PDCCH/PDSCH (step S207) and transmit a Physical Uplink Shared Channel (PUSCH)/Physical Uplink Control Channel (PUCCH) (step S208) according to a general UL/DL signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through UL or received by the UE from the eNB through DL, includes a DL/UL acknowledgment/Negative-acknowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

FIGS. 3 to 6 illustrate slot level structures of PUCCH formats. The PUCCH may have the following formats for transmission of control information.

(1) Format 1: used for on-off keying (OOK) modulation and scheduling request (SR)

(2) Formats 1a and 1b: used for ACK/NACK transmission

1) Format 1a: BPSK ACK/NACK for one codeword

2) Format 1b: QPSK ACK/NACK for two codewords (3) Format 2: used for QPSK modulation and CQI transmission (4) Formats 2a and 2b: used for simultaneous transmission of CQI and ACK/NACK Table 1 shows modulation schemes depending on PUCCH formats and the number of bits per subframe. Table 2 shows the number of RSs per slot depending on PUCCH formats. Table 3 shows SC-FDMA symbol locations in an RS depending on PUCCH formats. In Table 1, PUCCH formats 2a and 2b correspond to a normal cyclic prefix (CP).

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH format | Normal CP | Normal CP |
| --- | --- | --- |
| 1, 1a, 1b | 3 | 2 |
| 2 | 2 | 1 |
| 2a, 2b | 2 | N/A |

TABLE 3

| | SC-FDMA symbol locations in RS | |
| --- | --- | --- |
| PUCCH format | Normal CP | Normal CP |
| 1, 1a, 1b | 2, 3, 4 | 2, 3 |
| 2, 2a, 2b | 1, 5 | 3 |

Figure 3:
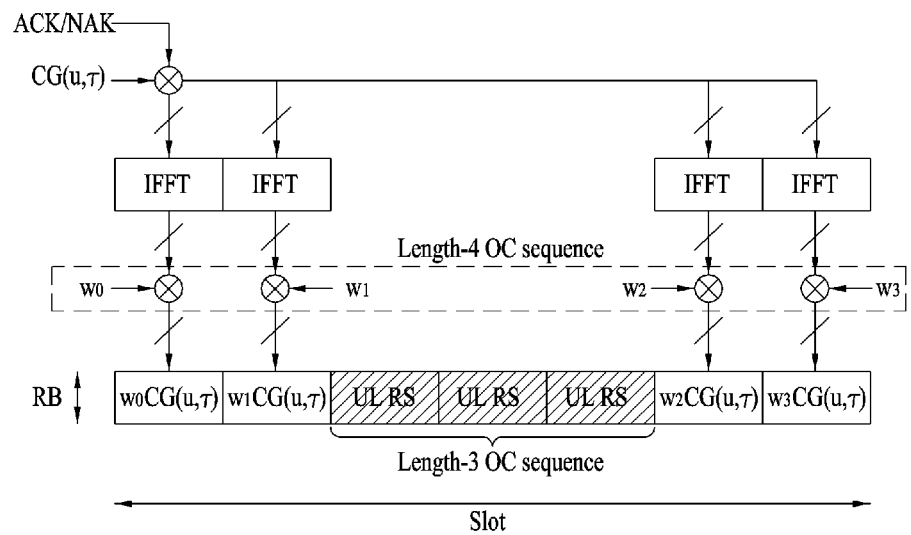
FIGS. 3 and 4 illustrate slot level structures of PUCCH formats 1a and 1b.
Figure 4:
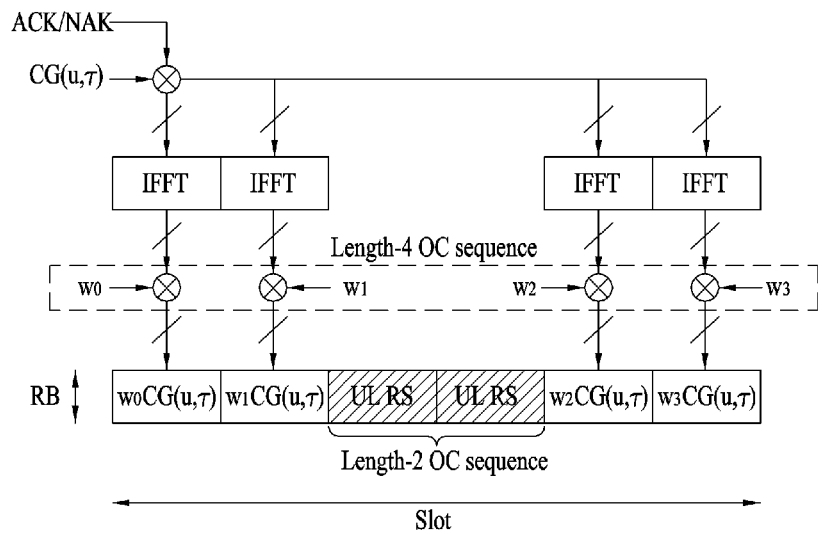

FIG. 3 illustrates a structure of PUCCH formats 1a and 1b in the case of a normal CP. FIG. 4 illustrates a structure of PUCCH formats 1a and 1b in the case of an extended CP. In PUCCH formats 1a and 1b, the same control information is repeated on a slot basis within a subframe. Each UE transmits an ACK/NACK signal on different resources configured with different cyclic shifts (CSs) (frequency-domain codes) of a computer-generated constant amplitude zero auto correlation (CG-CAZAC) sequence and orthogonal covers (OCs) or orthogonal cover codes (OCCs) (time-domain codes). The OC includes, for example, a Walsh/DFT orthogonal code. If the number of CSs is 6 and the number of OCs is 3, a total of 18 UEs may be multiplexed in the same physical resource block (PRB) on the assumption of a single antenna. Orthogonal sequences w0, w1, w2, and w3 may be applied in a certain time domain (after FFT modulation) or in a certain frequency domain (before FFT modulation).

For SR and persistent scheduling, an ACK/NACK resource composed of the CS, OC and PRB may be provided to a UE through radio resource control (RRC). For dynamic ACK/NACK and non-persistent scheduling, the ACK/NACK resource may be implicitly provided to the UE by the lowest CCE index of a PDCCH corresponding to a PDSCH.

Figure 5:
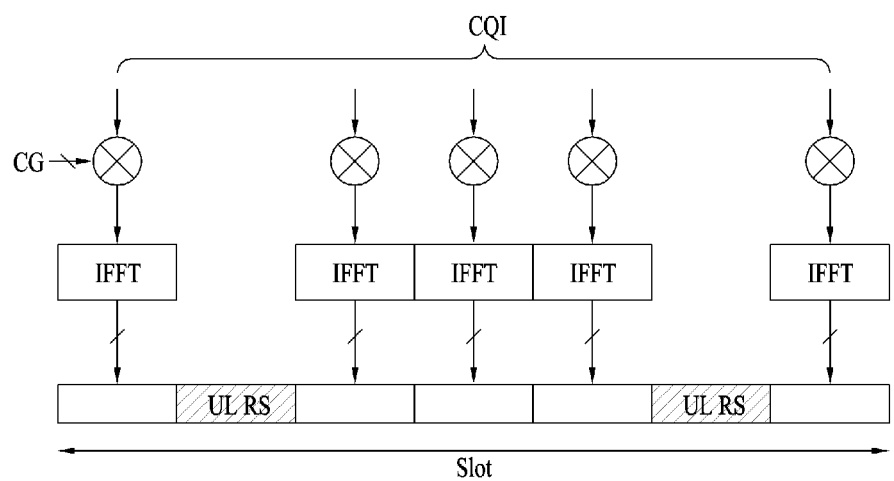
FIGS. 5 and 6 illustrate slot level structures of PUCCH formats 2/2a/2b.
Figure 6:
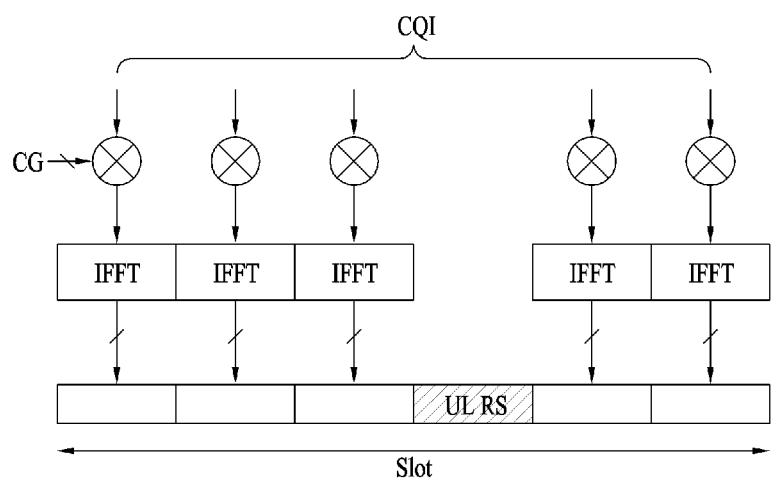

FIG. 5 illustrates a structure of PUCCH formats 2/2a/2b in the case of the normal CP. FIG. 6 illustrates a structure of PUCCH formats 2/2a/2b in the case of the extended CP. Referring to FIGS. 5 and 6, one subframe includes 10 QPSK data symbols in addition to an RS symbol in the normal CP case. Each QPSK symbol spreads in the frequency domain by the CS and is mapped to a corresponding SC-FDMA symbol. SC-FDMA symbol level CS hopping may be applied to randomize inter-cell interference. RSs may be multiplexed, and more particularly, code division multiplexed (CDMed) based on the CS. For example, assuming that the number of available CSs is 12 or 6, 12 or 6 UEs may be multiplexed in the same PRB. That is, in PUCCH formats 1/1a/1b and 2/2a/2b, a plurality of UEs may be multiplexed by CS+OC+PRB and CS+PRB.

Tables 4 and 5 below show length-4 and length-3 orthogonal sequences (OCs) for PUCCH formats 1/1a/1b, respectively.

TABLE 4

Length-4 orthogonal sequences
for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 5

Length-3 orthogonal sequences
for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 6 below shows OCs for an RS in PUCCH formats 1a/1b

TABLE 6

| | 1a and 1b | |
|---|---|---|
| Sequence index $\bar{n}_{oc}(n_s)$ | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 7 illustrates ACK/NACK channelization for PUCCH formats 1a and 1b in the case of $\Delta_{shift}^{PUCCH}=2$.

Figure 8:
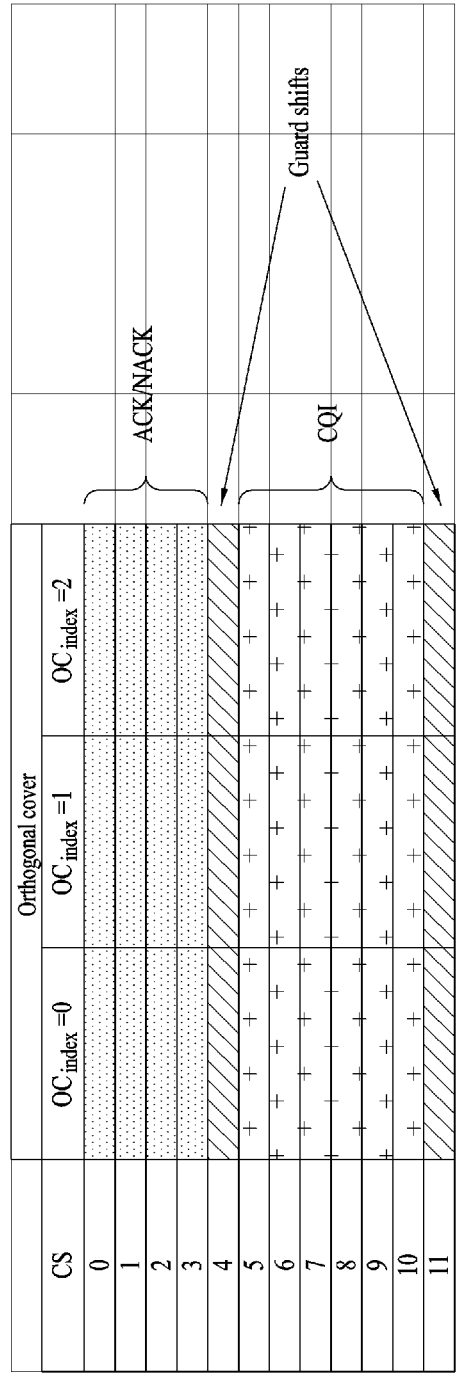
FIG. 8 illustrates channelization in a structure where PUCCH formats 1/1a/1b and PUCCH formats 2/2a/2b are mixed within the same PRB.

FIG. 8 illustrates channelization in a structure where PUCCH formats 1a/1b and PUCCH formats 2/2a/2b are mixed within the same PRB.

CS hopping and OC remapping may be applied as follows.

(1) Symbol-based cell-specific CS hopping for inter-cell interference randomization (2) Slot level CS/OC remapping 1) For inter-cell interference randomization 2) Slot-based access for mapping between ACK/NACK channel and resource (k)

A resource $n_r$ for PUCCH formats 1a/1b includes the following combination.

(1) CS (=DFT OC at symbol level) ($n_{cs}$)

(2) OC (OC at slot level) ($n_{oc}$)

(3) Frequency RB ($n_{rb}$)

When $n_{cs}$, $n_{oc}$, and $n_{rb}$ denote the indices of the CS, OC, and RB, respectively, a representative index $n_r$ includes $n_{cs}$, $n_{oc}$, and $n_{rb}$. That is, $n_r$ satisfies the relationship of $n_r=(n_{cs}, n_{oc}, n_{rb})$.

The CQI, PMI, RI, and a combination of the CQI and ACK/NACK may be transmitted in PUCCH formats 2/2a/2b. In this case, Reed Muller (RM) channel coding may be applied.

For example, in the LTE system, channel coding for a UL CQI is described as follows. A bit stream $a_0$, $a_1$, $a_2$, $a_3$, ..., $a_{A-1}$ is channel-coded using a (20, A) RM code. Table 7 shows a base sequence for the (20, A) code. Here, $a_0$ and $a_{A-1}$ represent the most significant nit (MSB) and the least significant bit (LSB), respectively. In the extended CP case, the maximum number of information bits is 11, except when the CQI and the ACK/NACK are simultaneously transmitted. After the bit stream is coded into 20 bits using the RM code, QPSK modulation may be applied. Before the QPSK modulation, the encoded bits may be scrambled.

TABLE 8

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 1 | 0 | 1 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated according to Equation 1.

$$b_i = \sum_{n=0}^{A-1} (a_n \cdot M_{i,n}) \bmod 2 \quad \text{[Equation 1]}$$

In Equation 1, i=0, 1, 2, . . . , B−1.

Table 8 below shows a UCI field for reporting wideband CQI feedback (single antenna port, transmit diversity, or open-loop spatial multiplexing PDSCH transmission).

TABLE 8

| Field | Bit widths |
|---|---|
| Wideband CQI | 4 |

Table 9 shows a UCI field for wideband CQI and PMI feedback. The field reports closed-loop spatial multiplexing PDSCH transmission.

TABLE 9

| | Bit widths | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 10 shows a UCI field for reporting wideband RI feedback.

TABLE 10

| | Bit widths | | |
|---|---|---|---|
| | | 4 antenna ports | |
| Field | 2 antenna ports | maximum 2 layers | maximum 4 layres |
| RI (Rank Indication) | 1 | 1 | 2 |

Figure 9:
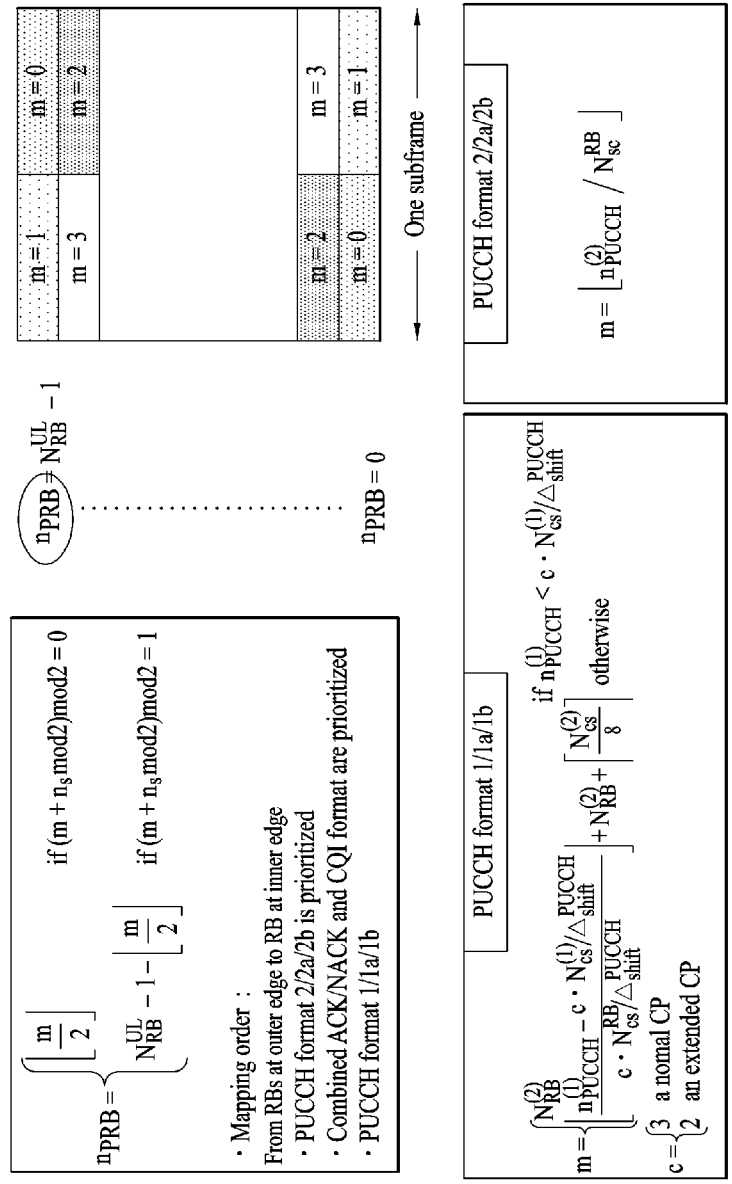
FIG. 9 illustrates PRB allocation for PUCCH transmission.

FIG. 9 illustrates PRB allocation. As shown in FIG. 9, the PRB may be used for PUCCH transmission in a slot $n_s$.

A multi-carrier system or carrier aggregation system refers to a system in which a plurality of carriers with a bandwidth smaller than a target bandwidth are aggregated for wideband support. When the plurality of carriers with the bandwidth smaller than the target bandwidth are aggregated, the bandwidth of the aggregated carriers may be limited to a bandwidth used in the legacy system for backward compatibility with the corresponding system. For example, the legacy LTE system may support bandwidths of 1.4, 3, 5, 10, 15 and 20 MHz, and the LTE-Advanced (LTE-A) system evolved from the LTE system may support a bandwidth greater than 20 MHz using only the bandwidths supported in the LTE system. Alternatively, a new bandwidth may be defined to support carrier aggregation, regardless of bandwidths used in the legacy system. The term "multi-carrier" may be used interchangeably with the terms "carrier aggregation" and "bandwidth aggregation". The term "carrier aggregation" may refer to both contiguous carrier aggregation and non-contiguous carrier aggregation.

<OFDM Numerology>

The new RAT system uses an OFDM transmission scheme or a transmission scheme similar thereto. The new RAT system may use OFDM parameters different from those of LTE. Alternatively, the new RAT system may follow the numerology of legacy LTE/LTE-A but have a larger system bandwidth (e.g., 100 MHz). Further, one cell may support a plurality of numerologies. That is, UEs operating based on different numerologies may coexist within one cell.

<Subframe Structure>

In the 3GPP LTE/LTE-A system, a radio frame has a length of 10 ms (307200 Ts) and includes 10 subframes (SFs) with the same size. All of the 10 SFs in one radio frame may be numbered. Here, Ts denotes a sampling time and is expressed as Ts=1/(2048*15 kHz). Each SF has a length of 1 ms and includes two slots. All of the 20 slots in one radio frame may be sequentially numbered from 0 to 19, and each slot has a length of 0.5 ms. The time required to transmit one SF is defined as a transmission time interval (TTI). Time resources may be distinguished by a radio frame number (or radio frame index), an SF number (or SF index), a slot number (or slot index), etc. The TTI refers to an interval for data scheduling. In the current LTE/LTE-A system, the transmission opportunity of a UL or DL grant is present every 1 ms, for example. That is, no multiple UL/DL grant opportunities are given within a time shorter than 1 ms. Accordingly, the TTI is 1 ms in the legacy LTE/LTE-A system.

Figure 10:
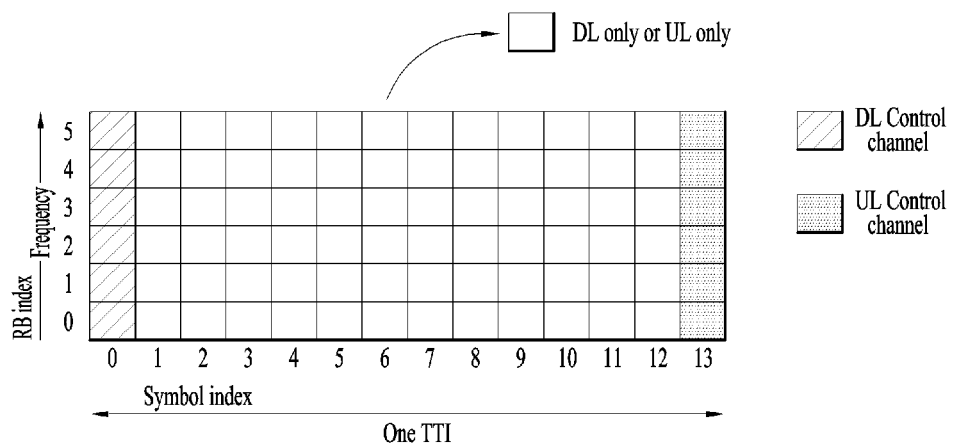
FIG. 10 shows an exemplary slot structure usable for a New Radio access technology (NR).

FIG. 10 shows an exemplary slot structure available in new radio access technology (NR).

In order to minimize the delay of data transmission, the NR system considers a slot structure in which a control channel and a data channel are TDMed (time-division-multiplexed).

In FIG. 10, the hatched area represents a transmission region of a DL control channel carrying DCI (e.g., PDCCH), and the black area represents a transmission region of a UL control channel carrying UCI (e.g., PUCCH). Here, the DCI is control information transmitted from a gNB to a UE and may include information on a cell configuration the UE should know, DL-specific information such as DL scheduling, UL-specific information such as a UL grant, etc. The UCI is control information transmitted from the UE to the gNB and may include a HARQ ACK/NACK report on DL data, a CSI report on a DL channel state, a scheduling request (SR), etc.

In FIG. 10, symbols from symbol index 1 to symbol index 12 may be used to transmit a physical channel carrying DL data (e.g., PDSCH) or transmit a physical channel carrying UL data (e.g., PUSCH). According to the slot structure shown in FIG. 2, since DL transmission and UL transmission are sequentially performed within one slot, transmission/reception of DL data and reception/transmission of a UL ACK/NACK for the DL data may be performed within the one slot. That is, the structure may reduce the time required to retransmit data when a data transmission error occurs, thereby minimizing the latency of final data transmission.

In the slot structure, a time gap is necessary in order that the gNB and UE switch to a reception mode from a transmission mode, and vice versa. For the switching between the transmission mode and the reception mode, some OFDM symbols at the time of DL-to-UL switching may be configured as a guard period (GP) in the slot structure.

That is, when the data region in a slot is used for DL data, the GP may be configured between the DL data region and the UL control channel region. When the data region in the slot is used for UL data, the GP may be configured between the DL control channel region and the UL data region. By doing so, the time gap for switching between the transmission and reception modes may be configured.

In the legacy LTE/LTE-A system, a DL control channel is TDMed with a data channel, and, and the PDCCH, which is a control channel, is distributed and transmitted over the entire system band. However, since it is expected that the bandwidth of a system increases to at least about 100 MHz in the new RAT, it may be less feasible to transmit a control channel over the entire band. If the UE monitors the entire band to receive a DL control channel for the purpose of data transmission/reception, it may increase the battery consumption of the UE and degrade the efficiency thereof. Thus, the present disclosure proposes to transmit a DL control channel by localizing or distributing the DL control channel to or over a partial frequency band of the system band, i.e., channel band.

In the NR system, the basic transmission unit is a slot. The duration of the slot may be configured with 14 symbols having a normal cyclic prefix (CP) or 12 symbols having an extended CP. The slot is a function of a used subcarrier spacing and scaled by time. That is, as the subcarrier spacing increases, the length of the slot decreases. For example, assuming that the number of symbols per slot is 14, if the number of slots in a 10 ms frame is 10 for a subcarrier spacing of 15 kHz, the number of slots increases to 20 for a subcarrier spacing of 30 kHz and 40 for a subcarrier spacing of 60 kHz. As the subcarrier spacing increases, the length of an OFDM symbol decreases. The number of OFDM symbols in the slot varies depending on whether the normal CP or extended CP is used but does not change depending on the subcarrier spacing. The basic time unit for LTE, Ts is defined as Ts=1/(15000*2048) seconds in consideration of a basic subcarrier spacing of 15 kHz and a maximum FFT size of 2048 in the LTE. The basic time unit Ts is also used as a sampling time for the 15 kHz subcarrier spacing. In the NR system, various subcarrier spacings including the 15 kHz subcarrier spacing are available, and since the subcarrier spacing is inversely proportional to a corresponding time length, the actual sampling time for subcarrier spacings larger than 15 kHz becomes shorter than Ts=1/(15000*2048) seconds. For example, the actual sampling time for subcarrier spacings of 30 kHz, 60 kHz, and 120 kHz may be 1/(2*15000*2048) seconds, 1/(4*15000*2048) seconds, and 1/(8*15000*2048) seconds, respectively.

<Analog Beamforming>

A fifth-generation (5G) mobile communication system under discussion is considering the use of an ultra-high frequency band, that is, a millimeter frequency band equal to or higher than 6 GHz in order to transmit data to a plurality of users in a wide frequency band while maintaining a high transmission rate. In 3GPP, this technology is called "NR", and thus the 5G mobile communication system is referred to as the NR system in the present disclosure. However, the millimeter frequency band has the following frequency characteristics: a signal is rapidly attenuated depending on distance due to the use of too high a frequency band. Therefore, the NR system using a frequency band equal to or higher than 6 GHz employs a narrow beam transmission scheme in which signal transmission is performed based on energy concentration in a specific direction rather than omni-directionally to compensate for rapid propagation attenuation and thus overcome the decrease in coverage caused by the rapid propagation attenuation. However, if a service is provided using only one narrow beam, the coverage of a base station (or gNB) decreases, and thus the base station provides the service in a wideband by collecting a plurality of narrow beams.

In the millimeter frequency band, that is, millimeter wave (mmW) band, since a wavelength is shortened, a plurality of antenna elements may be installed in the same area. That is, considering that the wavelength at 30 GHz band is 1 cm, a total of 100 antenna elements may be installed in a 5 by 5 cm panel at intervals of 0.5 lambda (wavelength) in the case of a 2-dimensional array. Therefore, in the mmW, the coverage or throughput may be improved by increasing the beamforming gain using multiple antenna elements.

To create a narrow beam in the millimeter frequency band, a beamforming method is mainly considered. According to the beamforming method, the base station or UE transmits the same signals with appropriate phase differences through multiple antennas to thereby increase energy only in a specific direction. Beamforming methods include digital beamforming for creating a phase difference between digital baseband signals, analog beamforming for creating a phase difference between modulated analog signals based on time delays (i.e., cyclic shifts), and hybrid beamforming using both the digital beamforming and analog beamforming. If a transceiver unit (TXRU) is provided to each antenna element to enable adjustment of transmit power and phase per antenna element, beamforming may be performed independently for each frequency resource. However, installing TXRUs in all of the about 100 antenna elements is less feasible in terms of cost. That is, considering that multiple antennas needs to be used to compensate for the rapid propagation attenuation in the millimeter frequency band, and the digital beamforming requires as many RF components (e.g., digital to analog converters (DACs), mixers, power amplifiers, and linear amplifiers) as the number of antennas, the implementation of the digital beamforming in the millimeter frequency band faces the following problem: the cost of communication devices increases. Therefore, when a large number of antennas are required as in the millimeter frequency band, the analog beamforming or the hybrid beamforming is considered. In the analog beamforming, multiple antenna elements are mapped to one TXRU, and the direction of a beam is controlled by an analog phase shifter. However, the analog beamforming is disadvantageous in that frequency selective beamforming (BF) is not provided because only one beam direction is generated over the entire band. As an intermediate form between the digital BF and analog BF, the hybrid BF has B TXRUs fewer than Q antenna elements. In the case of the hybrid BF, the directions of beams transmittable at the same time is limited to B or less although the number of beam directions depends on how B TXRUs and Q antenna elements are connected.

Figure 11:
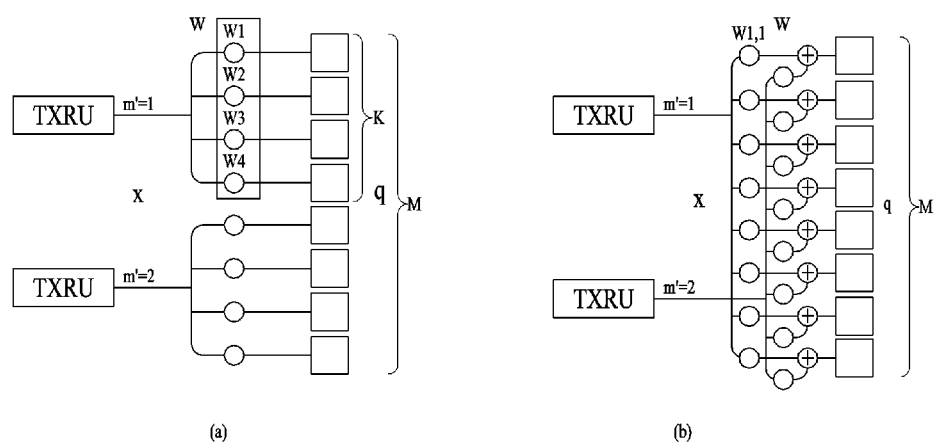
FIG. 11 illustrates examples of a connection mode of TXRU and an antenna element.

FIG. 11 illustrates methods for connecting a TXRU to an antenna element.

Specifically, FIG. 11 (a) illustrates a connection between a TXRU and a sub-array. In this case, the antenna element is connected only to one TXRU. In contrast, FIG. 11 (b) illustrates a connection between a TXRU and all antenna elements. In this case, the antenna element is connected to all TXRUs. In FIG. 11, W denotes a phase vector subjected to multiplication by an analog phase shifter. That is, the analog BF direction is determined by W. Here, the mapping relationship between CSI-RS antenna ports and TXRUs may be a one-to-one or one-to-many relationship.

In the digital BF, since a digital baseband signal to be transmitted or a received digital baseband signal is signal-processed, signals may be transmitted or received simultaneously in multiple directions using multiple beams as described above. In contrast, in the analog BF, since an analog signal to be transmitted or a received analog signal is beamformed after being modulated, signals may not be transmitted or received simultaneously in multiple directions beyond the coverage of one beam. Typically, the base station communicates with multiple users at the same time based on the wideband transmission or multi-antenna characteristics. If the base station uses the analog BF or hybrid BF and forms an analog beam in one beam direction, the gNB has no other way than to communicate only with users located along the same analog beam direction due to the feature of the analog BF. The RACH resource allocation and resource utilization method for a base station according to the present disclosure, which will be described later, is proposed by considering the restrictions due to the features of the analog or hybrid BF.

<Hybrid Analog Beamforming>

Figure 12:
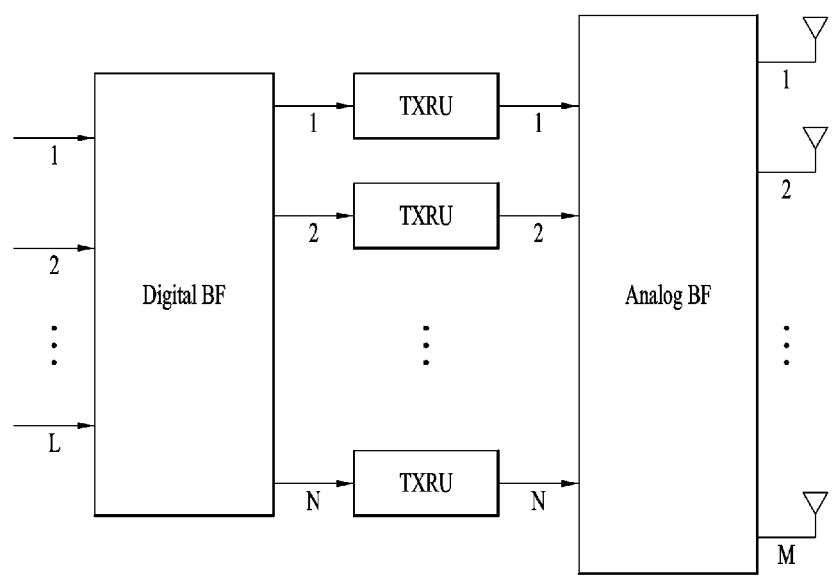
FIG. 12 abstractly shows a hybrid beamforming structure in aspects of Transceiver Unit (TXRU) and physical antenna.

FIG. 12 abstractly illustrates a hybrid beamforming structure in terms of TXRUs and physical antennas.

For a case where multiple antennas are used, the hybrid BF obtained by combining the digital BF and the analog BF has been introduced. The analog BF (or RF BF) is an operation of performing precoding (or combining) in an RF unit. The hybrid BF is advantageous in that it guarantees performance similar to that of the digital BF while reducing the number of RF chains and the number of DACs (or analog to digital converters (ADCs) since precoding (combining) is performed by both a baseband unit and an RF unit. For convenience, a hybrid BF structure may be represented by N TXRUs and M physical antennas. The digital BF for L data layers to be transmitted by a transmission end may be represented as an N-by-N matrix. In addition, N converted digital signals are converted to analog signals through TXRUs and then subjected to the analog BF represented as an M-by-N matrix. In FIG. 6, the number of digital beams is L, and the number of analog beams is N. Further, it is considered in the NR system that the base station is configured to be capable of changing the analog BF on a symbol basis to support more efficient BF for UEs in a specific area. When one antenna panel is defined by N TXRUs and M RF antennas, the introduction of a plurality of antenna panels to which independent hybrid BF is applicable is also considered. When the base station uses a plurality of analog beams, each UE may prefer a different analog beam for signal reception. Therefore, a beam sweeping operation in which for at least an SS, system information, paging, etc., the base station changes a plurality of analog beams on a symbol basis in a specific slot or SF to allow all UEs to have reception opportunities is considered.

Figure 13:
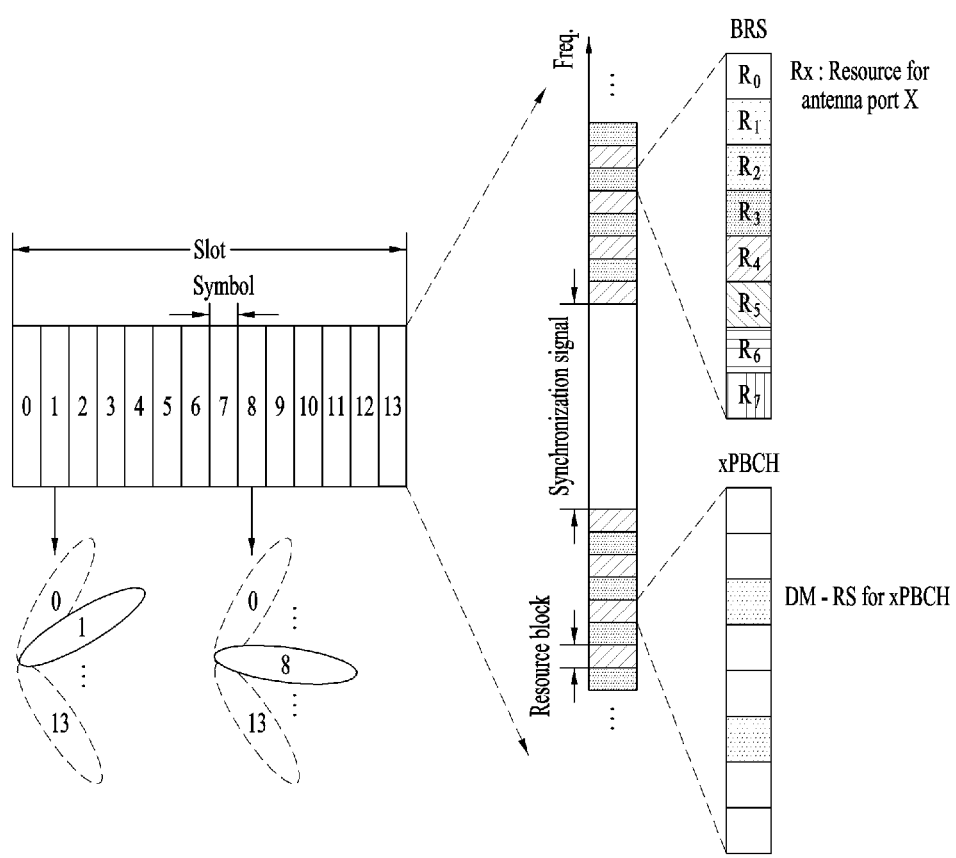
FIG. 13 illustrates beam sweeping operation for a synchronization signal and system information during downlink transmission.

FIG. 13 illustrates beam sweeping operation for an SS and system information during DL transmission. In FIG. 13, a physical resource or channel for broadcasting system information of the NR system is referred to as a physical broadcast channel (xPBCH). Analog beams from different antenna panels may be simultaneously transmitted in one symbol, and the introduction of a beam reference signal (BRS), that is, an RS transmitted for a single analog beam corresponding to a specific antenna panel as illustrated in FIG. 13 is under discussion to measure a channel per analog beam. The BRS may be defined for a plurality of antenna ports, and each antenna port of the BRS may correspond to a single analog beam. In contrast to the BRS, the SS or xPBCH may be transmitted for all analog beams included in an analog beam group so that any UE may receive the SS or the xPBCH successfully.

Figure 14:
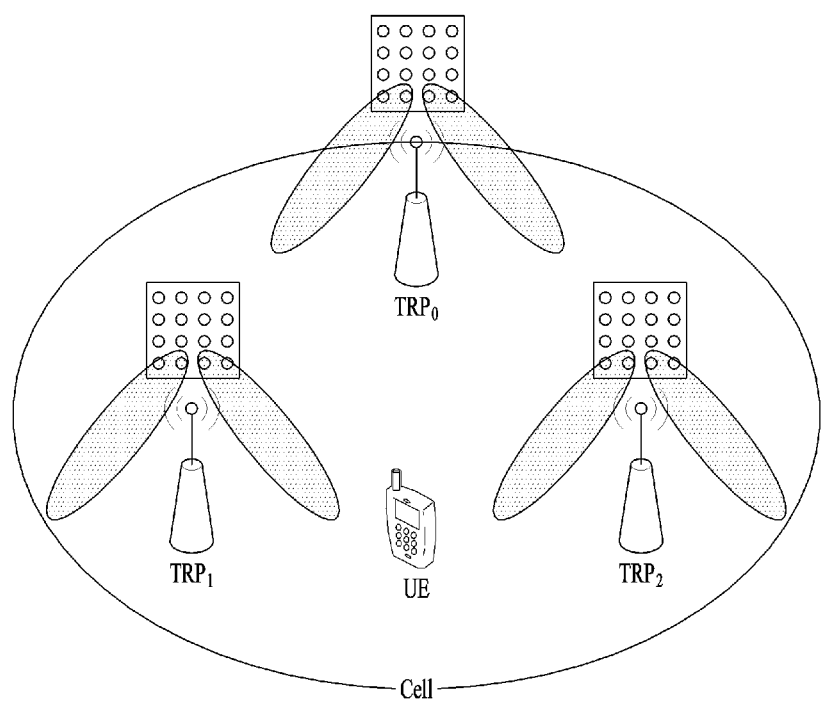
FIG. 14 illustrates a cell of a new radio access technology (NR) system.

FIG. 14 shows an exemplary cell of a New Radio access technology (NR) system.

Referring to FIG. 14, in a NR system, unlike that one BS forms one cell in a wireless communication system such as the existing LTE or the like, a scheme that a plurality of Transmission Reception Points (TRPs) form one cell is under discussion. If a plurality of TRPs form one cell, although a RTP that services a UE is changed, seamless communication is possible. Hence, mobility management of a UE is advantageously facilitated.

In the LTE/LTE-A system, PSS/SSS is transmitted in omni-directions. Unlike this, in the NR system, a following method is considered. Namely, a gNB applying mmWave performs a beamforming on a signal such as PSS, SSS, PBCH or the like by turning a direction of a beam omni-directionally and then transmits the corresponding signal. In doing so, transceiving a signal by turning a beam direction is referred to as a beam sweeping or a beam scanning. In the present disclosure, 'beam sweeping' indicates an operation of a transmitter side and 'beam scanning' indicates an operation of a receiver side. For example, assuming that a gNB is capable of having maximum N beam directions, the gNB transmits signals of PSS/SSS/PBCH and the like in the N beam directions, respectively. Namely, the gNB transmits synchronization signals of PSS/SSS/PBCH and the like in the respective directions. Alternatively, if the gNB is capable of forming N beams, a plurality of beams may be bundled into a single beam group and PSS/SSS/PBCH may be transmitted and received per beam group. In this case, one beam group includes one or more beams. A signal of PSS/SSS/PBCH or the like transmitted in the same direction may be defined as one SS block and a plurality of SS blocks may exist within a cell. In case that a plurality of SS blocks exist, an SS block index may be used to identify each SS block. For example, when PSS/SSS/PBCH is transmitted in 10 beam directions in a single system, PSS/SSS/PBCH in the same direction may configure one SS block and 10 SS blocks may be understood as existing in the corresponding system. In the present disclosure, a beam index may refer to an SS block index.

Hereinafter, a method of transmitting and receiving a UL control channel according to an embodiment of the present disclosure will be described.

In a next-generation communication system, for example, the NR system, a shortened TTI structure has been considered to reduce a time delay during information exchange.

Herein, a shortened TTI is referred to as a short TTI (sTTI). A HARQ-ACK transmission method using a sequence may be considered as a PUCCH transmission method in a system operating based on the sTTI. For example, an ACK/NACK may be mapped to CS values of a computer-generated sequence (CGS) used in the legacy LTE system, and the CGS may be used for HARQ-ACK transmission. Specifically, a UE may perform HARQ-ACK transmission as follows. When the UE successfully decodes DL data, the UE may transmit the CGS by setting a CS thereof to 0 to represent an ACK. When the UE fails to decode the DL data, the UE may transmit the CGS by setting a CS thereof to 6 to represent a NACK. In this case, an appropriate resource allocation method may need to be considered to transmit a UL control channel. Accordingly, the present disclosure proposes a method of configuring resources for UCI transmission in a communication system supporting the sTTI.

Before describing the present disclosure in detail, it is to be understood that this disclosure is not limited to specific embodiments of the present disclosure. For example, in the case of a sequence, it is apparent that various types of sequences, for example, a ZC sequence, an m-sequence, etc. may be used instead of the CGS. In addition, the embodiments of the present disclosure may be implemented independently or in combination.

For the HARQ-ACK transmission based on the sequence, a base station may need to designate a CS resource of the CGS to be used by a UE for the HARQ-ACK transmission. In this case, the base station may inform the UE the CS resource of the CGS to be used for the HARQ-ACK transmission through a higher layer signal and/or a physical layer signal.

For example, the base station may instruct the UE to use different CSs depending on DL data decoding results through the higher layer signal and/or physical layer signal. Specifically, the base station may instruct the UE to use a CS of 0 in the case of an ACK and a CS of 6 in the case of a NACK. However, since CSs used for PUCCH transmission within one sTTI are fixed, interference between neighboring cells may increase in some cases. Thus, to prevent the interference between neighboring cells from increasing, a method for CS randomization between sTTIs and/or symbols is required.

To this end, a cell-specific CS randomization pattern may be defined, and an offset may be allocated to each UE by the base station. Further, the CSs of the sequence may be used for the HARQ-ACK transmission, and the CS randomization between sTTIs and/or symbols may be performed. In this case, the offset for each UE may be allocated by higher layer signaling and/or physical layer signaling.

That is, the base station may allocate a specific offset to the UE and apply the corresponding offset to a CS according to the cell-specific CS randomization pattern. For example, the base station may allocate offsets of $X_1$ and $X_2$ to the UE and define CSs obtained by adding the corresponding offsets to the CS according to the cell-specific CS randomization pattern as the final CSs to be used for an ACK/NACK signal. Here, $X_1$ and $X_2$ may be an offset for the ACK and an offset for the NACK, respectively. The values of $X_1$ and $X_2$ may be provided by the base station to the UE through higher layer signaling and/or physical layer signaling.

When the CSs of the sequence are used for the HARQ-ACK, the number of CSs allocated for one UE may be equal to 2^(the number of HARQ-ACK bits). Accordingly, this may be considered when the corresponding offsets are applied to the CS according to the cell-specific CS randomization pattern. For example, when a 1-bit HARQ-ACK is transmitted, the base station may allocate to the UE offsets of $X_1$ and $X_2$, which respectively correspond to the ACK and the NACK. If the value of the CS according to the cell-specific CS randomization quence) pattern in a specific symbol is x, the UE may need to apply a CS of $(x+X_1) \bmod (N_{sc}^{sequence})$ to transmit the ACK in the corresponding symbol and apply a CS of $(x+X_2) \bmod (N_{sc}^{sequence})$ to transmit the NACK therein. Here, $N_{sc}^{sequence}$ denotes the number of subcarriers corresponding to the sequence, that is, the length of the sequence. If the sequence is used on the basis of one RB in the legacy LTE system, $N_{sc}^{sequence}$ may be replaced with $N_{sc}^{RB}$. Here, $N_{sc}^{RB}$ denotes the number of subcarriers in each RB.

Meanwhile, the BS may allocate one offset to be applied for the ACK to the UE. The UE may calculate a CS to be used for the ACK transmission based on the offset and then use a CS having the longest distance from the calculated CS in terms of codes for the NACK transmission. For example, if the CS for the ACK is calculated as 0 in a 12-length CGS, the CS for the ACK may be set to 6.

In this case, the CS for the ACK may be calculated as $(x+X_1) \bmod (N_{sc}^{sequence}/2^{(the\ number\ of\ HARQ\text{-}ACK\ bits)})$ and the CS having the longest distance from the calculated CS in terms of codes may be used as the CS for the NACK. For example, when the ACK/NACK sequence has a length of 12, a value obtained by adding 6 to the CS for the ACK may be used as the CS for the NACK. Meanwhile, in $(x+X_1) \bmod (N_{sc}^{sequence}/2^{(the\ number\ of\ HARQ\text{-}ACK\ bits)})$, which is to calculate the CS for the ACK, if the remainder of $N_{sc}^{sequence}/2^{(the\ number\ of\ HARQ\text{-}ACK\ bits)}$ is not an integer, the Floor function may be applied to calculate the CS for the ACK. That is, if the remainder of $N_{sc}^{sequence}/2^{(the\ number\ of\ HARQ\text{-}ACK\ bits)}$ is not an integer, the CS for the ACK may be calculated from the following equation: $(x+X_1) \bmod \lfloor N_{sc}^{sequence}/2^{(the\ number\ of\ HARQ\text{-}ACK\ bits)} \rfloor$.

When a 2-bit HARQ-ACK is transmitted, the interval between CSs may be determined such that the CSs corresponding to individual states are maximally distributed over the ACK/NACK sequence. For example, when the sequence for transmitting the 2-bit HARQ-ACK has a length of 12, the CS may be configured to have an interval of 3 (depending on the sequence length/the number of states). In the case of (ACK, ACK), a CS therefor may be calculated as $(x+X_1) \bmod (N_{sc}^{sequence}/2^{(the\ number\ of\ HARQ\text{-}ACK\ bits)})$, and CSs for the remaining states may be configured at the interval of 3. When the CS is configured for each state, Gray coding may be applied.

When the remainder of $N_{sc}^{sequence}/2^{(the\ number\ of\ HARQ\text{-}ACK\ bits)}$ is not an integer, the Floor function may be applied to calculate the CS for the ACK. In other words, if the remainder of $N_{sc}^{sequence}/2^{(the\ number\ of\ HARQ\text{-}ACK\ bits)}$ is not an integer, the CS for the ACK may be calculated from the following equation: $(x+X_1) \bmod \lfloor N_{sc}^{sequence}/2^{(the\ number\ of\ HARQ\text{-}ACK\ bits)} \rfloor$.

When no inter-symbol hopping is applied to each sTTI, multiplexing between UEs may be improved by an orthogonal cover code (OCC).

In this case, the OCC applied to each sTTI may be randomized using a sTTI index. For example, in the case of a sTTI system coexisting with the legacy LTE system, a final OCC index may be selected using the sTTI index as an input parameter instead of or in addition to the conventional OCC index calculation method. When the OCC index is selected without using the sTTI index as in the legacy LTE system, the OCC may be equally applied to all sTTIs in a slot or a subframe. Alternatively, the OCC may be applied to one of sTTIs in a slot or a subframe, and index offsets may be allocated for the remaining sTTIs in the slot or subframe, whereby different OCCs may be applied to the sTTIs in the slot or subframe. Further, a random pattern may be defined using a cell ID, and then different OCCs may be applied to sTTIs in a slot or a subframe based on the random pattern.

Using the OCC index, $n_{oc}^{(\tilde{p})}(n_s)$ and the CS randomization pattern for each symbol, $n_{cs}^{(\tilde{p})}(n_s,l)$, the above-described embodiment may be represented as Equations 2 to 5. In Equations 2 to 5, $n_{sc}^{(\tilde{p})}(n_s,l)$ may correspond to x.

In the legacy LTE system, the OCC index may be represented as shown in Equation 2. In the case of a system independent of the legacy LTE system, the slot index, $n_s$ in Equation 2 may be replaced with the index of a sTTI or the index of a slot in the sTTI.

$$n_{oc}^{(\tilde{p})}(n_s) = \lfloor n_{\tilde{p}}'(n_s) \cdot \Delta_{shift}^{PUCCH} / N_{sc}^{sequence} \rfloor$$

$$n_{cs}^{(\tilde{p})}(n_s,l) = (n_{cs}^{cell}(n_s,l) + n_{\tilde{p}}'(n_s) \cdot \Delta_{shift}^{PUCCH} + (n_{oc}^{\tilde{p}}(n_s) \bmod \Delta_{shift}^{PUCCH})) \bmod N_{sc}^{sequence} \quad \text{[Equation 2]}$$

If no OCC is applied due to hopping in the sTTI, the cell-specific CS randomization pattern may be defined as shown in Equation 3. In addition, if the sTTI index is used as an input parameter when the cell-specific CS randomization pattern is calculated, the sTTI index may be used in randomizing the CS pattern.

$$n_{cs}^{(\tilde{p})}(n_s,l) = (n_{cs}^{cell}(n_s,l) + n_{\tilde{p}}'(n_s) \cdot \Delta_{shift}^{PUCCH}) \bmod N_{sc}^{sequence} \quad \text{[Equation 3]}$$

In Equation 2, $N_{sc}^{sequence}$ denotes the number of subcarriers corresponding to the sequence, that is, the length of the sequence. If the sequence is used on the basis of one RB in the legacy LTE system, $N_{sc}^{sequence}$ may replaced with $N_{sc}^{RB}$. Here, $N_{sc}^{RB}$ denotes the number of subcarriers in each RB.

Equation 4 is an additional equation for calculating factors used in Equations 2 and 3.

$$n_{\tilde{p}}'(n_s) = n_{PUCCH}^{(1,\tilde{p})} \bmod (\alpha \cdot N_{sc}^{sequence} / \Delta_{shift}^{PUCCH})$$

$$n_{PUCCH}^{(1,\tilde{p})} = n_{CCE} + N_{PUCCH}^{(1)} \quad \text{[Equation 4]}$$

In Equation 4, $n_{CCE}$ may denote the lowest CCE index of a DL control channel scheduling DL data for the UE, and $N_{PUCCH}^{(1)}$ may denote a value provided by the base station to the UE through higher layer signaling and/or physical layer signaling.

In Equation 4, a may denote the number of symbols included in a sTTI if no hopping is applied to the sTTI. If hopping is applied to the sTTI, a may denote the number of symbols in a symbol group including the smallest number of symbols among symbol groups in the sTTI, which are generated by the hopping.

Meanwhile, the OCC index calculated from Equations 2 to 4 may be equally applied to all sTTIs within a slot. Alternatively, the OCC index may be applied to one sTTI within the slot, and index offsets, which are received via higher layer signaling, may be applied to the remaining sTTIs in the slot, thereby applying different OCC indices to multiple sTTIs included in one slot.

To apply a different OCC to each slot and/or sTTI, the base station may indicate the value of $N_{PUCCH}^{(1)}$ for each slot and/or sTTI. For example, the value of $N_{PUCCH}^{(1)}$ may be provided as $N_{PUCCH}^{(1)}(n_s)$ in each slot. In this case, Equation 4 may be modified to Equation 5. Here, $n_s$ may be replaced with the sTTI index.

$$n_{\tilde{p}}'(n_s) = n_{PUCCH}^{(1,\tilde{p})}(n_s) \bmod (\alpha \cdot N_{sc}^{sequence} / \Delta_{shift}^{PUCCH})$$

$$n_{PUCCH}^{(1,\tilde{p})}(n_s) = n_{CCE} N_{PUCCH}^{(1)}(n_s) \quad \text{[Equation 5]}$$

Meanwhile, the base station may inform the UE of a resource hopping pattern for an ACK/NACK in a sTTI through higher layer signaling and/or physical layer signaling. For example, it is assumed that there are 100 resource blocks (RBs), RBs #0 to #99. If the UE successfully decodes DL data (in the case of an ACK), the resource hopping pattern may be configured such that RB #0→RB #99. On the contrary, if the UE fails to decode the DL data (in the case of a NACK), the resource hopping pattern may be configured such that RB #99→RB #0.

In this case, a sequence to which the CS according to the cell-specific CS randomization pattern is applied may be transmitted on a resource for the ACK or NACK signal depending on the resource hopping pattern.

To apply a different CS to each resource position based on resource hopping, a CS hopping pattern may be used. For example, assuming that there is one resource hopping pattern of RB #0→RB #99, different information may be indicated within the one resource hopping pattern by the CS hopping pattern, i.e., a difference between a CS corresponding to RB #0 and a CS corresponding to RB #99. The CSs corresponding to the resource hopping pattern may be indicated by higher layer signaling and/or physical layer signaling. When the CSs corresponding to the resource hopping pattern are configured, the CSs may have absolute values, or offset values corresponding to the resource hopping pattern may be indicated. In the latter case, HARQ-ACK information corresponding to a predefined resource hopping pattern may be transmitted by applying the CS offsets to the cell-specific CS randomization pattern.

For example, when $Y_1$ and $Y_2$ are provided as the CS offsets corresponding to the resource hopping pattern, two CSs may be obtained by applying $Y_1$ and $Y_2$ to the cell-specific CS randomization pattern. Then, to transmit HARQ-ACK information, the CS obtained by applying $Y_1$ may be applied to an ACK/NACK sequence and mapped to RB #0, and the CS obtained by applying $Y_2$ may be applied to the ACK/NACK sequence and mapped to RB #99.

In other words, the HARQ-ACK may be transmitted by a combination of the resource hopping pattern and the CS hopping pattern.

Figure 15:
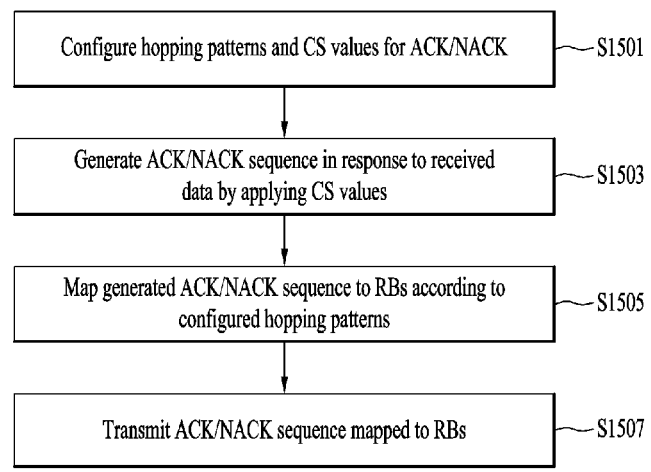
FIG. 15 is a diagram for explaining a method of transmitting an ACK/NACK signal according to an embodiment of the present disclosure.

The above-described embodiment will be described again with reference to FIG. 15. A UE may configure a resource hopping pattern and/or a CS value for an ACK/NACK signal by receiving the resource hopping pattern and/or CS value from a base station (S1501). Depending on whether the UE succeeds in decoding data received from the base station, the UE may generate an ACK/NACK sequence. In this case, the UE may generate the ACK/NACK sequence by applying a CS value corresponding to an ACK or a NACK (S1503). As the CS value corresponding to the ACK or NACK, the UE may use the CS value received from the base station or a value obtained by applying the CS value received from the base station to a cell-specific CS randomization pattern. Thereafter, the UE may map the generated ACK/NACK sequence to RBs according to the configured resource hopping pattern and then transmit the ACK/NACK sequence to the base station (S1505 to S1507).

The above procedure may be applied not only when a 1-bit HARQ-ACK is transmitted but also when a 2-bit HARQ-ACK is transmitted. In the case of the 2-bit HARQ-ACK, assuming that resource hopping patterns are hp #1 (RB #0→RB #99) and hp #2 (RB #99→RB #0) and CS hopping patterns are cp #1 (CS 0→CS 6) and cp #2 (CS 6→CS 0), (ACK, ACK), (ACK, NACK), (NACK, ACK), and (NACK, NACK) may be set to (hp #1, cp #1), (hp #1, cp #2), (hp #2, cp #1), and (hp #2, cp #2), respectively, thereby distinguishing between the states of the 2-bit HARQ-ACK. Further, as described above, the resource hopping pattern and the CS hopping pattern may match with bit differences between individual states by applying Gray coding.

When configuring a resource for HARQ-ACK transmission, the base station may configure multiple resource groups and inform the UE of the multiple resource groups via higher layer signaling. In this case, each resource group may include multiple resources, and each resource may correspond to each HARQ-ACK state. The UE may transmit a value corresponding to one HARQ-ACK state among resources in a resource group so that the base station may distinguish between HARQ-ACK states. Here, the resource may refer to a CS, a PRB, a hopping pattern, or any combination thereof.

As a method of matching the resource with the HARQ-ACK state, it may be considered that a PRB hopping pattern is matched with each resource group. In this case, resources included in the resource group may correspond to CS values, and the CS values may correspond to the HARQ-ACK states.

In other words, the PRB hopping pattern may be determined for each resource group, and the PRB hopping pattern may be commonly applied to multiple HARQ-ACK states. Specifically, assuming that a 2-bit HARQ-ACK is transmitted and a PRB hopping pattern corresponding to a specific resource group is RB #0→RB #99, four CS resources in the corresponding resource group (CS 0, CS 3, CS 6, and CS 9) may correspond to HARQ-ACK states, respectively, and the specific PRB hopping pattern may be commonly applied to the four CS resources.

Meanwhile, as another HARQ-ACK transmission method, a PRB hopping pattern corresponding to one resource group, which is indicated by higher layer signaling, and a reverse pattern of the PRB hopping pattern may be used. Specifically, multiple resources included in an indicated resource group may be divided into two subgroups. Then, one subgroup may be matched with the PRB hopping pattern, and the other subgroup may be matched with the reverse pattern of the PRB hopping pattern. Each resource included in each subgroup may correspond to each HARQ-ACK state, and in this case, each subgroup may include the same resources.

Specifically, it is assumed that when a 2-bit HARQ-ACK is transmitted, a PRB hopping pattern corresponding to a specific resource group is RB #0→RB #99 and a reverse pattern of the PRB hopping pattern is RB #99→RB #0. In this case, four CS resources in the corresponding resource group (CS 0, CS 3, CS 6, and CS 9) may correspond to HARQ-ACK states, respectively. The four CS resources may be divided into the following two subgroups: (CS 0, CS 3) and (CS 6, CS 9). The resource hopping pattern of the first subgroup may be set to RB #0→RB #99, and the resource hopping pattern of the second subgroup may be set to RB #99→RB #0. As described above, each subgroup may include the same resources. For example, the two subgroups may have the same CS resources as follows: (CS 0, CS 3) and (CS 0, CS 3). The same resources of each subgroup may be interpreted to mean that a specific CS resource is matched with multiple HARQ-ACK states.

Figure 16:
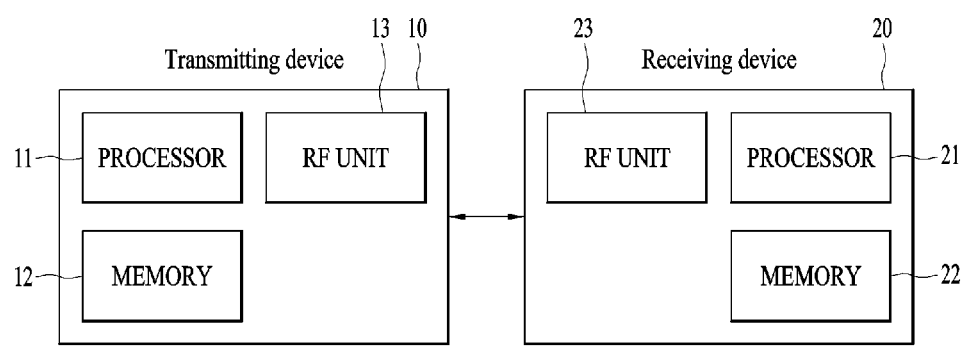
FIG. 16 is a block diagram illustrating the components of a transmitting device 10 and a receiving device 20 for implementing the present disclosure.

FIG. 16 is a block diagram of a transmitting device 10 and a receiving device 20 configured to implement exemplary embodiments of the present disclosure.

Referring to FIG. 10, the transmitting device 10 and the receiving device 20 respectively include RF unit 13 and 23 for transmitting and receiving radio signals carrying information, data, signals, and/or messages, memories 12 and 22 for storing information related to communication in a wireless communication system, and processors 11 and 21 connected operationally to the RF unit 13 and 23 and the memories 12 and 22 and configured to control the memories 12 and 22 and/or the RF unit 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF unit 13 and 23 include one or more antennas. An antenna performs a function of transmitting signals processed by the RF unit 13 and 23 to the exterior or receiving radio signals from the exterior to transfer the radio signals to the RF unit 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In the present disclosure, the RF units 13 and 23 may support reception BF and transmission BF. For example, the RF units 13 and 23 may be configured to perform the functions described above with reference to FIGS. 5 to 8. In addition, each of the RF units 13 and 23 may be referred to as a transceiver.

In embodiments of the present disclosure, a UE operates as the transmitting device 10 on UL and as the receiving device 20 on DL. In embodiments of the present disclosure, a gNB operates as the receiving device 20 on UL and as the transmitting device 10 on DL. Hereinafter, a processor, an RF unit, and a memory provided in the UE are referred to as a UE processor, a UE RF unit, and a UE memory, respectively, and a processor, an RF unit, and a memory provided in the gNB are referred to as a gNB processor, a gNB RF unit, and a gNB memory, respectively.

The gNB processor according to the present disclosure may be configured to control the transceiver to transmit data to the UE and receive an ACK/NACK signal in response to the data. When it is determined that the ACK/NACK signal is transmitted according to a first hopping pattern, the gNB processor may be configured to determine that the ACK/NACK signal in response to the data is an ACK. When it is determined that the ACK/NACK signal is transmitted according to a second hopping pattern, the gNB processor may be configured to determine that the ACK/NACK signal in response to the data is a NACK. The second hopping pattern may be a reverse pattern of the first hopping pattern. If a sequence corresponding to the ACK/NACK signal is obtained by applying a first CS value to a base sequence for transmitting the ACK/NACK signal, the gNB processor may be configured to determine the signal as the ACK. If the sequence is obtained by applying a second CS value to the base sequence, the gNB processor may be configured to determine the signal as the NACK. The gNB processor may be configured to control the transceiver to transmit, to the UE, a cell-specific CS randomization pattern and an offset value configured for each UE, which are used to determine the first and second CS values.

The UE processor according to the present disclosure may be configured to control the transceiver to receive data from the gNB and transmit an ACK/NACK signal in response to the data. When the data is successfully decoded, that is, when an ACK signal is transmitted, the UE processor may be configured to control the transceiver to transmit the ACK signal according to a first hopping pattern. When the data is not successfully decoded, that is, when a NACK signal is transmitted, the UE processor may be configured to control the transceiver to transmit the NACK signal according to a second hopping pattern. The second hopping pattern may be a reverse pattern of the first hopping pattern.

Depending on whether the received data is successfully decoded, the UE processor may be configured to generate either the ACK signal or the NACK signal. In the case of the ACK signal, the UE processor may generate the ACK signal by applying a first CS value to a base sequence for transmitting the ACK/NACK signal. In the case of the NACK signal, the UE processor may generate the NACK signal by applying a second CS value to the base sequence for transmitting the ACK/NACK signal.

The first and second CS values may be determined based on a cell-specific CS value and an offset value configured for each UE, which are determined based on the index of a sTTI according to a cell-specific CS randomization pattern. The first CS value may be determined by applying the offset value to the cell-specific CS value, and the second CS value may be determined such that a difference between the first and second CS values becomes a specific value. Here, the specific value may depend on the length of the base sequence and the number of bits of the ACK/NACK signal.

The gNB processor or the UE processor may be configured to implement the present disclosure on a cell operating in a high frequency band above 6 GHz where the analog or hybrid BF is applied.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give the broadest scope consistent with the new principles and features disclosed herein.

INDUSTRIAL APPLICABILITY

Although the method for transmitting and receiving a UL control channel and device therefor are described based on the 5G NR system, the method and device are applicable to various wireless communication systems as well as the 5G NR system.

The invention claimed is:

1. A method of transmitting an acknowledgement/negative-acknowledgement (ACK/NACK) signal by a user equipment (UE) in a wireless communication system, the method comprising:
   receiving data from a base station (BS);
   generating an ACK signal or a NACK signal in response to the data;
   based on the ACK signal being generated, transmitting, to the BS, the ACK signal based on applying a first cyclic shift (CS) value to a base sequence for transmitting the ACK/NACK signal; and
   based on the NACK signal being generated, transmitting, to the BS, the NACK signal based on applying a second CS value to the base sequence,
   wherein the first CS value is different from the second CS value,
   wherein the first CS value is determined based on applying an offset value configured for each UE to a cell-specific CS value configured for each cell,
   wherein the second CS value is determined such that a difference between the first and second CS values becomes a specific value, and
   wherein the specific value depends on a length of the base sequence and a number of bits of the ACK/NACK signal.

2. The method of claim 1, wherein the cell-specific CS value is determined based on an index of a transmission time interval (TTI) for transmitting the ACK signal or the NACK signal.

3. A user equipment (UE) for transmitting an acknowledgement/negative-acknowledgement (ACK/NACK) signal in a wireless communication system, the UE comprising:
   a transceiver configured to transmit and receive a signal to and from a base station (BS); and
   a processor configured to control the transceiver, wherein the processor is configured to:
control the transceiver to receive data from the BS;
generate an ACK signal or a NACK signal in response to the data;
based on the ACK signal being generated, control the transceiver to transmit, to the BS, the ACK signal based on applying a first cyclic shift (CS) value to a base sequence for transmitting the ACK/NACK signal; and
based on the NACK signal being generated, control the transceiver to transmit, to the BS, the NACK signal based on applying a second CS value to the base sequence,
wherein the first CS value is different from the second CS value,
wherein the first CS value is determined based on applying an offset value configured for each UE to a cell-specific CS value configured for each cell,
wherein the second CS value is determined such that a difference between the first and second CS values becomes a specific value, and
wherein the specific value depends on a length of the base sequence and a number of bits of the ACK/NACK signal.

4. The UE of claim 3, wherein the cell-specific CS value is determined based on an index of a transmission time interval (TTI) for transmitting the ACK signal or the NACK signal.

5. A method of receiving an acknowledgement/negative-acknowledgement (ACK/NACK) signal by a base station (BS) in a wireless communication system, the method comprising:
transmitting data to a user equipment (UE);
receiving the ACK/NACK signal in response to the data;
based on the reception of the ACK/NACK signal based on applying a first cyclic shift (CS) value to a base sequence for receiving the ACK/NACK signal, determining that the ACK/NACK signal indicates an ACK; and
based on the reception of the ACK/NACK signal based on applying a second CS value to the base sequence, determining that the ACK/NACK signal indicates a NACK,
wherein the first CS value is different from the second CS value,
wherein the first CS value is determined based on applying an offset value configured for each UE to a cell-specific CS value configured for each cell,
wherein the second CS value is determined such that a difference between the first and second CS values becomes a specific value, and
wherein the specific value depends on a length of the base sequence and a number of bits of the ACK/NACK signal.

6. A base station (BS) for receiving an acknowledgement/negative-acknowledgement (ACK/NACK) signal in a wireless communication system, the BS comprising:
a transceiver configured to transmit and receive a signal to and from a user equipment (UE); and
a processor configured to control the transceiver,
wherein the processor is configured to:
control the transceiver to transmit data to the UE;
control the transceiver to receive the ACK/NACK signal in response to the data;
based on the reception of the ACK/NACK signal based on applying a first cyclic shift (CS) value to a base sequence for receiving the ACK/NACK signal, determine that the ACK/NACK signal indicates an ACK; and
based on the reception of the ACK/NACK signal based on applying a second CS value to the base sequence, determine that the ACK/NACK signal indicates a NACK,
wherein the first CS value is different from the second CS value,
wherein the first CS value is determined based on applying an offset value configured for each UE to a cell-specific CS value configured for each cell,
wherein the second CS value is determined such that a difference between the first and second CS values becomes a specific value, and
wherein the specific value depends on a length of the base sequence and a number of bits of the ACK/NACK signal.

* * * * *